(12) United States Patent
Leja

(10) Patent No.: US 6,273,083 B1
(45) Date of Patent: Aug. 14, 2001

(54) TOOL WITH A HEATED HANDLE

(76) Inventor: Richard Leja, 8087 Wall Rd., Armstrong Creek, WI (US) 54103

( * ) Notice: Subject to any disclaimer, the term of this patent is extended or adjusted under 35 U.S.C. 154(b) by 0 days.

(21) Appl. No.: 09/557,201

(22) Filed: Apr. 21, 2000

(51) Int. Cl.[7] .................................. B25G 1/00; F24J 1/00
(52) U.S. Cl. .................. 126/204; 126/263.01; 81/489
(58) Field of Search .............................. 126/263.01, 206, 126/204; 43/23; 81/489, 490

(56) References Cited

U.S. PATENT DOCUMENTS 4,020,825 * 5/1977 Fusetti ................................ 126/206

FOREIGN PATENT DOCUMENTS

2754464-A1 * 6/1979 (DE) .

* cited by examiner

*Primary Examiner*—Sara Clarke
(74) *Attorney, Agent, or Firm*—Goldstein Law Offices P.C.

(57) ABSTRACT

A tool with a heated handle including a tool head having a downwardly extending stem portion. An upper handle portion is provided having an upper end and a lower end. The upper end is secured to the downwardly extending stem portion of the tool head. A lower handle portion is provided having an upper end secured to the lower end of the upper handle portion. The lower handle portion has an open lower end and a hollow interior. The lower handle portion has a plurality of apertures therein exposing the hollow interior. The open lower end has an end cap hingedly coupled thereto. A heat cartridge is provided that is dimensioned for being received within the hollow interior of the lower handle portion.

6 Claims, 2 Drawing Sheets

TOOL WITH A HEATED HANDLE

BACKGROUND OF THE INVENTION

The present invention relates to a tool with a heated handle and more particularly pertains to making the wielding of a tool easier in cold weather.

The use of heated handle devices is known in the prior art. More specifically, heated handle devices heretofore devised and utilized for the purpose of heating a handle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,584,787 to Aho discloses a heated handle comprised of an inner cylindrical container for holding a fuel stick, for use with a fishing rod. U.S. Pat. No. 4,654,970 to Nagashima discloses a heated handle for a power driven chain saw. U.S. Pat. No. Des. 367,657 to Sayles discloses an ornamental design for a heated handle for a snow blower. U.S. Pat. No. 5,276,310 to Schmidt discloses an electrically heated toolbox.

While these devices fulfill their respective, particular objective and requirements, the aforementioned patents do not describe a tool with a heated handle for making the wielding of a tool easier in cold weather.

In this respect, the tool with a heated handle according to the present invention substantially departs from the conventional concepts and designs of the prior art, and in doing so provides an apparatus primarily developed for the purpose of making the wielding of a tool easier in cold weather.

Therefore, it can be appreciated that there exists a continuing need for a new and improved tool with a heated handle which can be used for making the wielding of a tool easier in cold weather. In this regard, the present invention substantially fulfills this need.

SUMMARY OF THE INVENTION

In the view of the foregoing disadvantages inherent in the known types of heated handle devices now present in the prior art, the present invention provides an improved tool with a heated handle. As such, the general purpose of the present invention, which will be described subsequently in greater detail, is to provide a new and improved tool with a heated handle which has all the advantages of the prior art and none of the disadvantages.

To attain this, the present invention essentially comprises a tool head having a downwardly extending stem portion. An upper handle portion is provided having an upper end and a lower end. The upper end is secured to the downwardly extending stem portion of the tool head. The upper handle portion is of solid construction. A lower handle portion is provided having an upper end secured to the lower end of the upper handle portion. The lower handle portion has an open lower end and a hollow interior. The lower handle portion has a plurality of apertures therein exposing the hollow interior. The open lower end has an end cap hingedly coupled thereto. A heat cartridge is provided that is dimensioned for being received within the hollow interior of the lower handle portion. The heat cartridge is defined by a flexible central tube having a pair of enlarged rigid end caps. A lowermost end cap has a handle secured thereto. The central tube has a mixture of sodium acetate and water therein. The central tube has a flexible metal wire disposed therein whereby flexing of the metal wire will activate the mixture to provide heat.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tool with a heated handle which has all the advantages of the prior art heated handle devices and none of the disadvantages.

It is another object of the present invention to provide a new and improved tool with a heated handle which may be easily and efficiently manufactured and marketed.

It is a further object of the present invention to provide a new and improved tool with a heated handle which is of durable and reliable construction.

An even further object of the present invention is to provide a new and improved tool with a heated handle which is susceptible of a low cost of manufacture with regard to both materials and labor, and which accordingly is then susceptible of low prices of sale to the consuming public, thereby making such a tool with a heated handle economically available to the buying public.

Even still another object of the present invention is to provide a new and improved tool with a heated handle for making the wielding of a tool easier in cold weather.

Lastly, it is an object of the present invention to provide a new and improved tool with a heated handle including a tool head having a downwardly extending stem portion. An upper handle portion is provided having an upper end and a lower end. The upper end is secured to the downwardly extending stem portion of the tool head. A lower handle portion is provided having an upper end secured to the lower end of the upper handle portion. The lower handle portion has an open lower end and a hollow interior. The lower handle portion has a plurality of apertures therein exposing the hollow interior. The open lower end has an end cap hingedly coupled thereto. A heat cartridge is provided that is dimensioned for being received within the hollow interior of the lower handle portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREPFRRED EMBODIMENT

Figure 1:
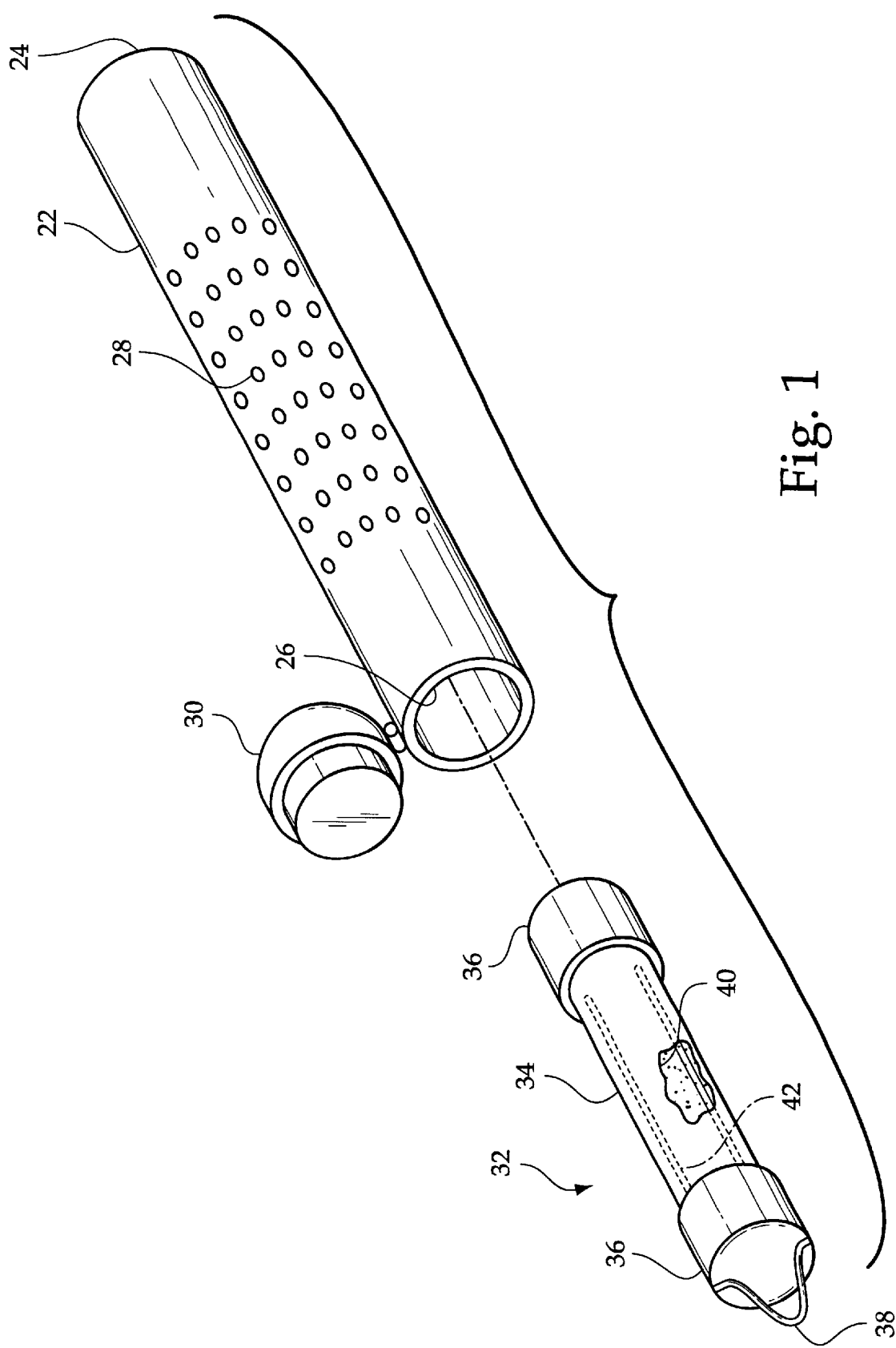
FIG. 1 is a exploded perspective view of the preferred embodiment of the tool with a heated handle constructed in accordance with the principles of the present invention.
Figure 2:
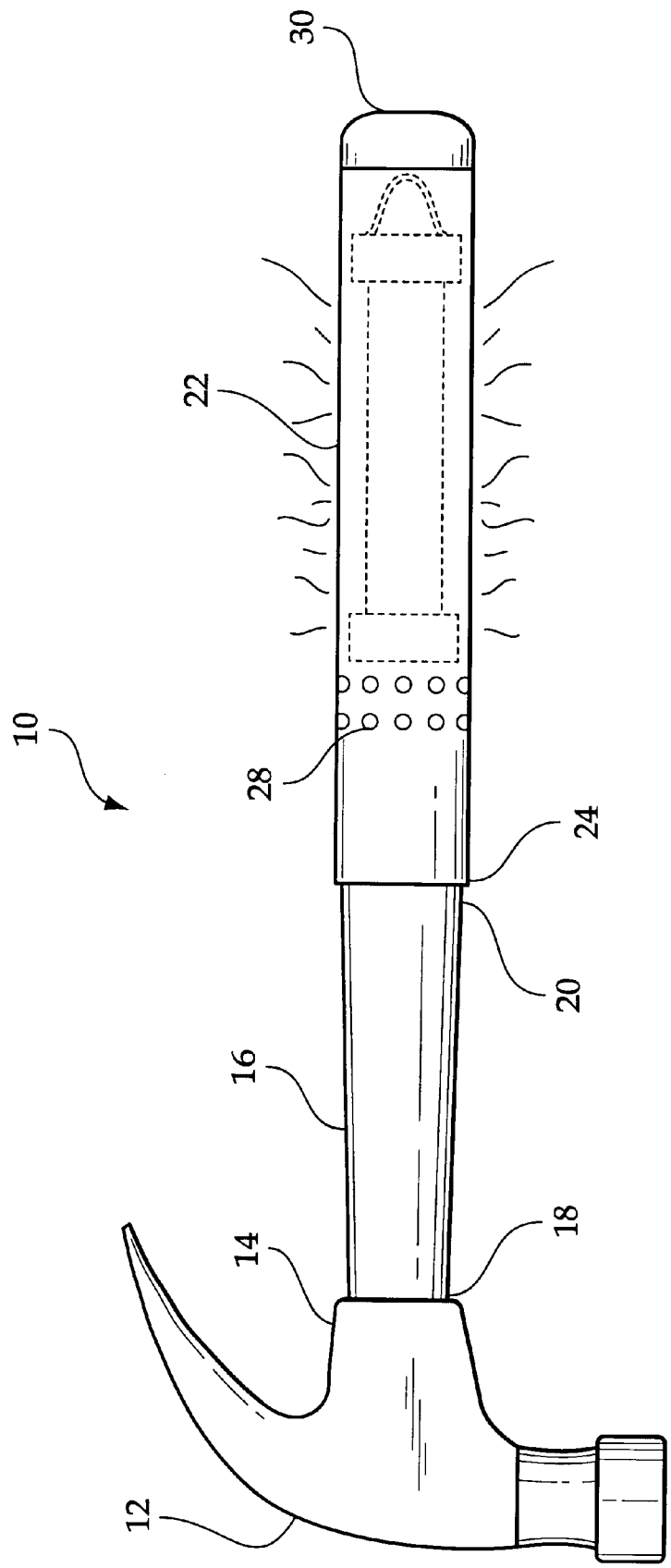
FIG. 2 is a side view of the present invention illustrated in use.

With reference now to the drawings, and in particular, to FIGS. 1 and 2 thereof, the preferred embodiment of the new and improved tool with a heated handle embodying the principles and concepts of the present invention and generally designated by the reference number 10 will be described.

Specifically, it will be noted in the various Figures that the device relates to a tool with a heated handle for making the wielding of a tool easier in cold weather. In its broadest context, the device consists of a tool head, an upper handle portion, a lower handle portion, and a heat cartridge. Such components are individually configured and correlated with respect to each other so as to attain the desired objective.

The tool head 12 has a downwardly extending stem portion 14. The tool head 12 utilized in FIG. 2 is a hammer, but any type of tool head could be utilized for the present invention.

The upper handle portion 16 has an upper end 18 and a lower end 20. The upper end 18 is secured to the downwardly extending stem portion 14 of the tool head 12. The upper handle portion 16 is of solid construction. The upper handle portion 16 is preferably fabricated of wood, metal, or fiberglass to provided strength and durability.

The lower handle portion 22 has an upper end 24 secured to the lower end 20 of the upper handle portion 16. The lower handle portion 22 has an open lower end 26 and a hollow interior. The lower handle portion 22 has a plurality of apertures 28 therein exposing the hollow interior. The open lower end 26 has an end cap 30 hingedly coupled thereto.

The heat cartridge 32 is dimensioned for being received within the hollow interior of the lower handle portion 22. The heat cartridge 32 is defined by a flexible central tube 34 having a pair of enlarged rigid end caps 36. The end caps 36 are sized to prevent rattling within the hollow interior of the lower handle portion 22 while still being able to allow the heat cartridge 32 to slide outwardly of the open lower end 26 of the lower handle portion 22 with limited friction. A lowermost end cap has handle 38 secured thereto. This handle 38 is essentially a flexible wire that will collapse against the end cap 36 when the end cap 30 of the lower handle portion 22 is closed over the open lower end 26 thereof. The central tube 34 has a mixture 40 of sodium acetate and water therein. The central tube 34 has a flexible metal wire 42 disposed therein whereby flexing of the metal wire 42 will activate the mixture 40 to provide heat. This heat will permeate through the apertures 28 of the lower handle portion 22 to provide warmth to the hand of the person handling the device 10.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tool with a heated handle for making the wielding of a tool easier in cold weather comprising, in combination:

a tool head having a downwardly extending stem portion;

an upper handle portion having an upper end and a lower end, the upper end being secured to the downwardly extending stem portion of the tool head, the upper handle portion being of solid construction;

a lower handle portion having an upper end secured to the lower end of the upper handle portion, the lower handle portion having an open lower end and a hollow interior, the lower handle portion having a plurality of apertures therein exposing the hollow interior, the open lower end having an end cap hingedly coupled thereto;

a heat cartridge dimensioned for being received within the hollow interior of the lower handle portion, the heat cartridge being defined by a flexible central tube having a pair of enlarged rigid end caps, a lowermost end cap having a handle secured thereto, the central tube having a mixture of sodium acetate and water thereon, the central tube having a flexible metal wire disposed therein whereby flexing of the metal wire will activate the mixture to provide heat.

2. A tool with a heated handle for making the wielding of a tool easier in cold weather comprising, in combination:

a tool head having a downwardly extending stem portion;

an upper handle portion having an upper end and a lower end, the upper end being secured to the downwardly extending stem portion of the tool head;

a lower handle portion having an upper end secured to the lower end of the upper handle portion, the lower handle portion having an open lower end and a hollow interior, the lower handle portion having a plurality of apertures therein exposing the hollow interior, the open lower end having an end cap hingedly coupled thereto;

a heat cartridge dimensioned for being received within the hollow interior of the lower handle portion.

3. The tool with a heated handle as set forth in claim 2 wherein the upper handle portion is of solid construction.

4. The tool with a heated handle as set forth in claim 2 wherein the heat cartridge is defined by a flexible central tube having a pair of enlarged rigid end caps.

5. The tool with a heated handle as set forth in claim 4 wherein a lowermost end cap has a handle secured thereto.

6. The tool with a heated handle as set forth in claim 4 wherein the central tube has a mixture of sodium acetate and water therein, the central tube having a flexible metal wire disposed therein whereby flexing of the metal wire will activate the mixture to provide heat.

* * * * *